(12) United States Patent  
Yamaguchi

(10) Patent No.: US 7,826,735 B2  
(45) Date of Patent: Nov. 2, 2010

(54) AUTO FOCUS UNIT AND DIGITAL CAMERA

(75) Inventor: Satoru Yamaguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 887 days.

(21) Appl. No.: 11/677,183

(22) Filed: Feb. 21, 2007

(65) Prior Publication Data

US 2007/0196091 A1 Aug. 23, 2007

(30) Foreign Application Priority Data

Feb. 22, 2006 (JP) ............................ 2006-045762

(51) Int. Cl.
*G03B 3/10* (2006.01)
(52) U.S. Cl. .......................... 396/95; 396/153; 348/352
(58) Field of Classification Search .................. 396/51, 396/95, 153; 348/208.14, 352
See application file for complete search history.

(56) References Cited

U.S. PATENT DOCUMENTS

| | | | | |
|---|---|---|---|---|
| 4,980,715 A * | 12/1990 | Utagawa | ...................... | 396/95 |
| 5,485,003 A * | 1/1996 | Kusada | .................... | 250/201.8 |
| 5,835,641 A * | 11/1998 | Sotoda et al. | ................ | 382/291 |
| 6,072,642 A | 6/2000 | Shirai | ......................... | 359/823 |
| 6,351,605 B1 | 2/2002 | Ogi et al. | ....................... | 396/56 |
| 6,417,883 B1 * | 7/2002 | Kaneda | ...................... | 348/350 |
| 6,874,955 B2 | 4/2005 | Morishita | .................... | 396/354 |
| 2005/0270408 A1 * | 12/2005 | Kwon et al. | ................. | 348/345 |

OTHER PUBLICATIONS

U.S. Appl. No. 11/677,191 to Yamaguchi, filed Feb. 21, 2007.

* cited by examiner

*Primary Examiner*—Melissa J Koval  
*Assistant Examiner*—Warren K Fenwick  
(74) *Attorney, Agent, or Firm*—Greenblum & Bernstein P.L.C.

(57) ABSTRACT

An auto focus unit, comprising a pursuit block, a lens driver, a detection block, and a controller, is provided. The pursuit block pursues the movements of an optical image of the target-object. The auto focus unit brings an optical image of the target-object into focus on a light-receiving surface. The target-object is desired to be brought into focus. The lens driver causes a focus lens to move so that an optical image of a scanning-area is brought into focus. The detection block detects the light intensity of an area including the scanning area. The controller causes the pursuit block to suspend a pursuit of the target-object when the light intensity detected by the detection block is lower than a predetermined threshold value.

20 Claims, 5 Drawing Sheets

AUTO FOCUS UNIT AND DIGITAL CAMERA

BACKGROUND OF THE INVENTION

1. Field of the Invention

The present invention relates to an auto focus unit and a digital camera that adjusts a position of a focus lens in an optical system automatically so that an optical image of an object through the optical system can be brought into focus.

2. Description of the Related Art

A recent digital camera has an auto focus function. Several methods currently exist for carrying out the auto focus function, one of which is explained in brief below. A scanning-area is fixed upon the light-receiving surface of an imaging device to capture the optical image. Whenever the imaging device captures the optical image, a focus lens is re-positioned along an optical axis and a contrast value in the scanning-area is detected. The detected contrast values corresponding to a plurality of positions of the focus lens are recorded in a memory. One position of the focus lens, of which the contrast value is highest among the recorded contrast values, is selected as the in-focus position of the focus lens, and the focus lens is subsequently moved to this selected position. In the above method, it is necessary to compare a plurality of detected contrast values in the fixed scanning-area.

In addition, an image-pursuit function that enables the location of the image of a target-object to be tracked automatically is known. As the image of a target-object moves about within a space corresponding to an entire image to be captured, the image pursuit function pursues the movements of the image of the target-object about that space, crossing multiple, sequential time periods so that a plurality of the entire image to be captured is captured sequentially. A moving object in an entire image to be captured can be focused upon by carrying out the auto focus function in cooperation with the image-pursuit function. For example, the scanning-area capturing an optical image of a target-object is moved according to the movement of the target-object within the entire image by carrying out the image-pursuit function, and the auto focus function is carried out based on the moved scanning-area.

However, the auto focus function does not work well with a moving object if the optical image of the target-object is dark.

SUMMARY OF THE INVENTION

Therefore, an object of the present invention is to provide an auto focus unit and a digital camera that are capable of focusing on a moving object in a stable manner.

According to the present invention, an auto focus unit, comprising a pursuit block, a lens driver, a detection block, and a controller, is provided. The auto focus unit brings an optical image of a target-object into focus on a light-receiving surface of an imaging device. The target-object is desired to be brought into focus. The optical image of the target-object is included in an entire optical image. The entire optical image is incident through a photographic optical system. The pursuit block pursues the movements of an optical image of the target-object within an effective imaging area of the imaging device. The lens driver causes a focus lens of the photographic optical system to move so that an optical image of a scanning-area is focused on the light-receiving surface. A part of the optical image of the target-object is captured in the scanning-area. The detection block detects the light intensity of an area including at least the scanning area. The controller causes the pursuit block to suspend pursuit of the target-object when the light intensity detected by the detection block is lower than a predetermined value.

Further, the photographic optical system comprises a zoom optical system. The zoom optical system adjusts the focal length of the photographic optical system. The predetermined threshold value is changed according to the focal length.

Further, the imaging device is connected to an image signal processing system. The image signal processing system carries out signal processing for image magnification to magnify an optical image captured in a partial area. The partial area is similar to the effective imaging area. The similarity ratio is less than one. The value set as the predetermined threshold value when the signal processing for image magnification is carried out is higher than value set as the predetermined threshold value when the focal length is adjusted to maximum.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
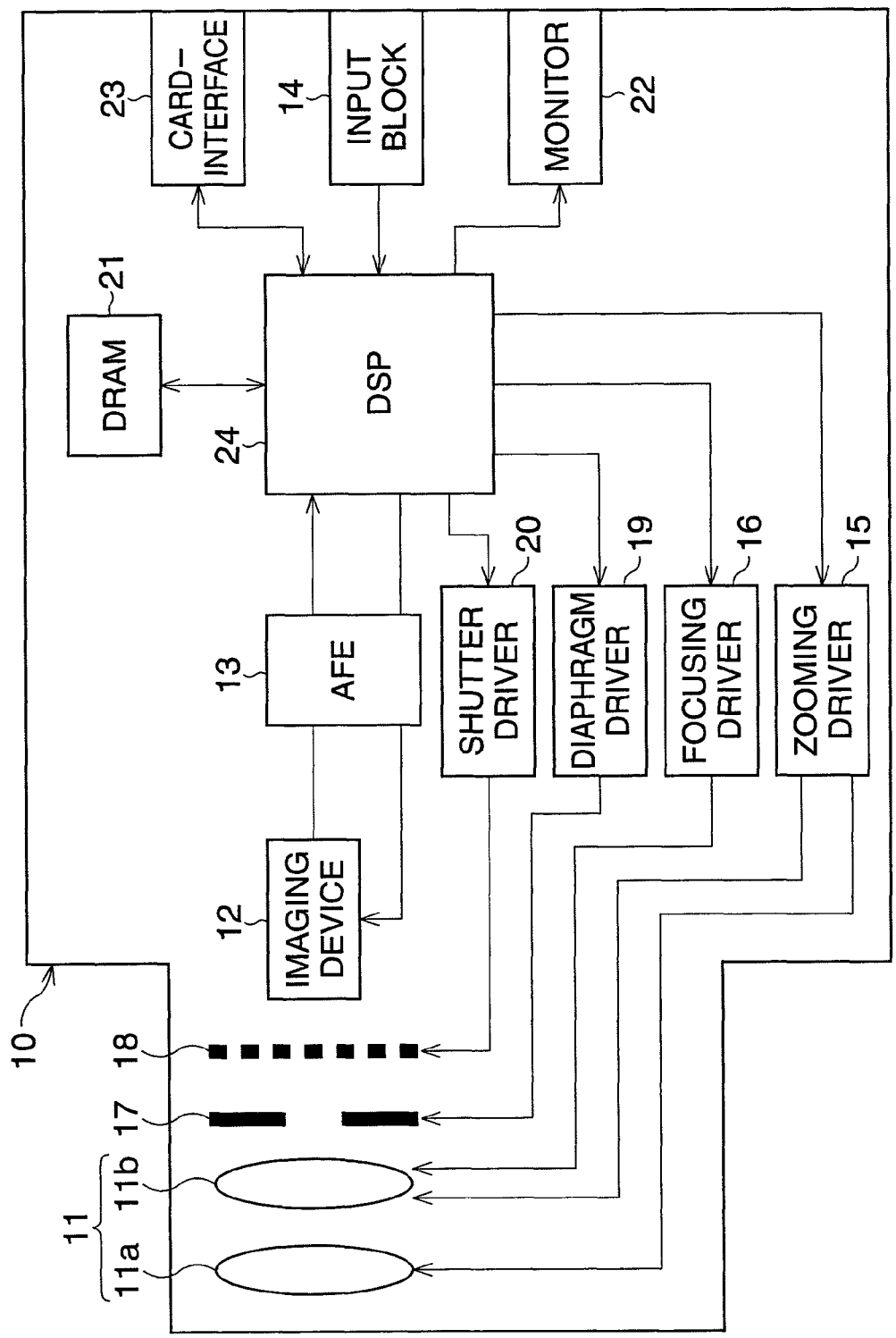
FIG. 1 is a block diagram showing the internal structure of a digital camera having an auto focus unit of an embodiment of the present invention.

The present invention is described below with reference to the embodiment shown in the drawings.

In FIG. 1, a digital camera 10 comprises a photographic optical system 11, an imaging device 12, an analog front end (AFE) 13, a DSP 24, an input block 14, a zooming driver 15, a focusing driver 16 and various other components.

The photographic optical system 11 is optically connected to the imaging device 12. An optical image of an object through the photographic optical system 11 is incident to the light-receiving surface of the imaging device 12. The imaging device 12 is, for example, a CCD area sensor. When the imaging device 12 captures the optical image of the object upon its light-receiving surface, the imaging device 12 generates an image signal corresponding to the captured optical image.

The photographic optical system 11 comprises plural lenses, including a zoom lens 11a and a focus lens 11b. The positions of the zoom lens 11a and the focus lens 11b are adjustable along an optical axis of the photographic optical system 11.

The zoom lens 11a and the focus lens 11b form a zoom optical system. The focal length of the photographic optical system 11 is adjusted by moving the zoom lens 11a and the focus lens 11b in relationship to each other. Incidentally, the focal length is adjustable between the range of n1 (mm) and n6 (mm). Further, an optical image of an object can be focused on the light-receiving surface of the imaging device 12 by re-positioning the focus lens 11b.

The zoom lens 11a and the focus lens 11b can be manually re-positioned along the optical axis by a user. In addition, the zoom lens 11a and the focus lens 11b can also be re-positioned by the zooming driver 15. Further, the focus lens 11b can also be re-positioned by the focusing driver 16. Incidentally, the focus adjustment is automatically carried out by an auto focus function, which is described later.

A diaphragm 17 and a shutter 18 are mounted between the photographic optical system 11 and the imaging device 12. The intensity of light, made incident on the light-receiving surface of the imaging device 12, is adjustable by adjusting an aperture ratio of the diaphragm 17. An optical image reaches the light-receiving surface by opening the shutter 18, and an optical image is shielded from the light-receiving surface by closing the shutter 18. The diaphragm driver 19 drives the diaphragm 17 so that the aperture ratio can be adjusted. The shutter driver 20 drives the shutter 18 so that the shutter 18 can be opened and closed.

Incidentally, the zooming driver 15, the focusing driver 16, the diaphragm driver 19, and the shutter driver 20 are connected to the DSP 24. The DSP 24 controls each operation of the zooming driver 15, the focusing driver 16, the diaphragm driver 19 and the shutter driver 20.

The imaging device 12 is electrically connected to the DSP 24 via the AFE 13. A clock signal is sent from the DSP 24 to the AFE 13, which generates a frame signal and an imaging device driving signal based on the received clock signal. The imaging device driving signal is sent to the imaging device 12, which is driven based on the imaging device driving signal. The imaging device 12 generates an image signal that is synchronized with the frame signal.

The generated image signal is sent to the AFE 13, which carries out correlated double sampling and gain adjustment on the image signal. In addition, the image signal is converted into image data, which is digital data that is sent to the DSP 24.

The DSP 24 is connected to a dynamic random access memory (DRAM) 21, which is used as a work memory for data processing. The image data received by the DSP 24 is temporarily stored in the DRAM 21. The DSP 24 carries out predetermined data processing on the image data stored in the DRAM 21.

The DSP 24 is connected to a monitor 22. The image data, having undergone predetermined data processing, is sent to the monitor 22. An image, corresponding to the image data received by the monitor 22, can be displayed on the monitor 22.

The DSP 24 is connected to a card-interface 23. When a release operation, described later, is carried out, the image data, having undergone predetermined data processing, is stored in a memory card (not depicted), which is connected to the card-interface 23.

The DSP 24 is connected to the input block 14 where a user inputs operational commands for handling the digital camera 10. The input block 14 comprises a release button (not depicted), a multi-functional cross-key (not depicted), a power button (not depicted), and other buttons. The DSP 24 orders each component of the digital camera 10 to carry out the appropriate operation according to a user's command input to the input block 14.

By depressing the release button halfway, a first switch (not depicted) is switched on. Exposure adjustment and focus adjustment are then carried out. In the exposure adjustment, adjustment of the aperture ratio of the diaphragm 17, adjustment of shutter speed, and gain adjustment for the image signal are carried out. In the focus adjustment, the position of the focus lens 11b is adjusted so that an optical image of a target-object can be focused on the light-receiving surface, which is described in detail later.

Further, by fully depressing the release button, a second switch (not depicted) is switched on. Then, the shutter 18 is driven so as to open and close, and the imaging device 12 is driven so as to capture a static optical image.

Figure 2:
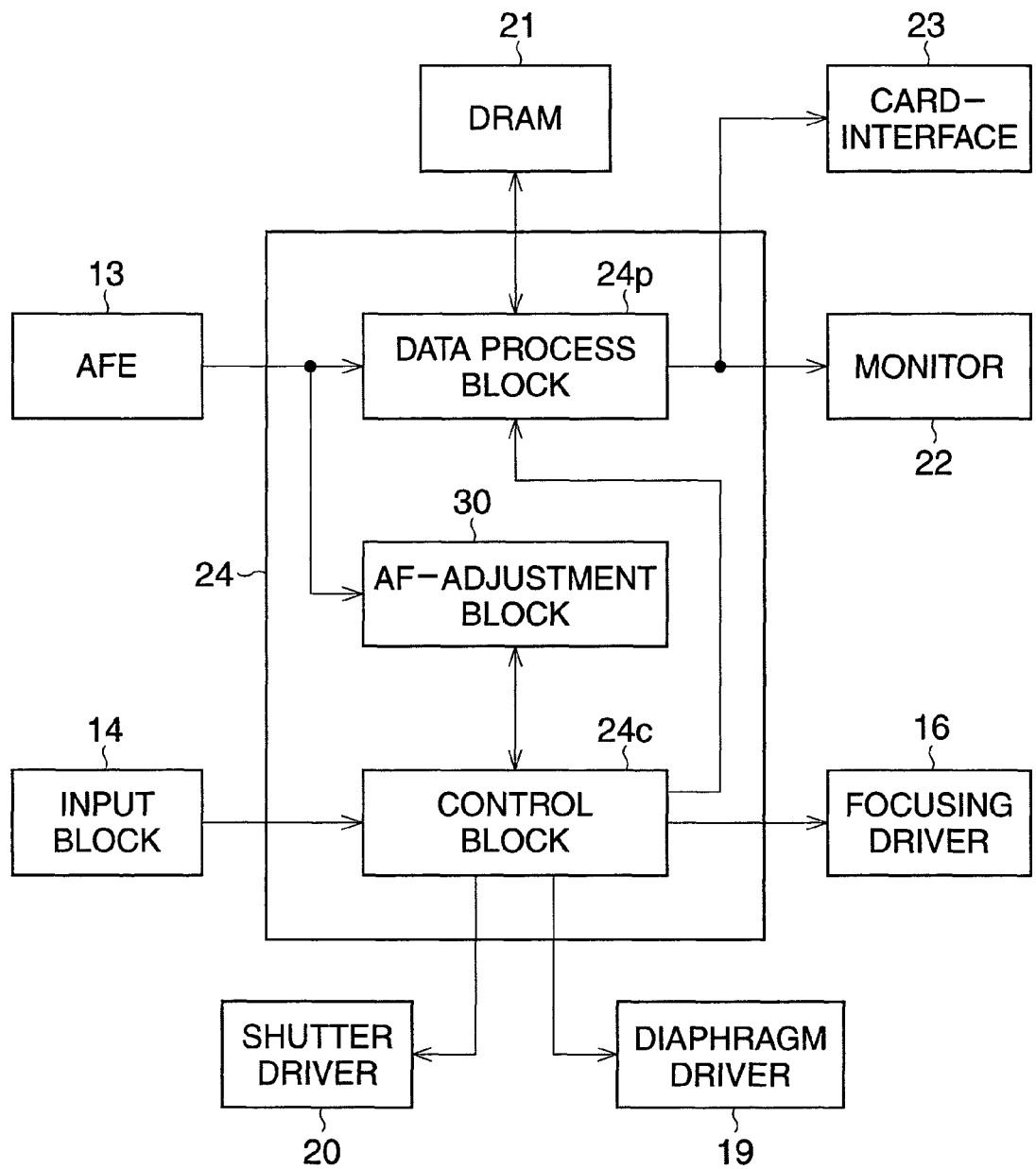
FIG. 2 is a block diagram showing the internal structure of the DSP.

The internal structure of the DSP 24 is explained in detail below using FIG. 2. In FIG. 2, the DSP 24 comprises a data process block 24p, an AF-adjustment block 30, and a control block 24c.

The image data is sent from the AFE 13 to the data process block 24p, which stores the received image data in the DRAM 21. In addition, the data process block 24p carries out predetermined data processing on the stored image data. Further, the data process block 24p sends the image data, having undergone predetermined data processing, to the monitor 22 or the memory card via the card-interface 23.

The image data is sent from the AFE 13 to the AF-adjustment block 30. The digital camera 10 has both normal auto focus and pursuit auto focus functions. By carrying out the normal auto focus function, an object that is located in a fixed partial area of a frame of the entire image to be captured is brought into focus. By carrying out the pursuit auto focus function, an object that is moving in the frame of the entire image to be captured is brought into focus. Either the normal auto focus function or the pursuit auto focus function is selected by an operational command to the input block 14. The AF-adjustment block 30 determines the position of the focus lens 11b based on the received image data so that the target-object is focused on the light-receiving surface.

An input signal according to an operational command input to the input block 14 is sent from the input block 14 to the control block 24c, which controls the data process block 24p, the AF-adjustment block 30, and each component of the digital camera 10 according to the received input signal.

For example, in the exposure adjustment, the control block 24c controls both diaphragm driver 19 to drive the diaphragm 17 and the shutter driver 20 to open and close the shutter 18.

Further, the control block 24c controls the focusing driver 16 to re-position the focus lens 11b in the focus adjustment. In the focus adjustment, the control block 24c receives lens-position data corresponding to the position of the focus lens determined by the AF-adjustment block 30. The control block 24c controls the focusing driver 16 based on the received lens-position data.

Figure 3:
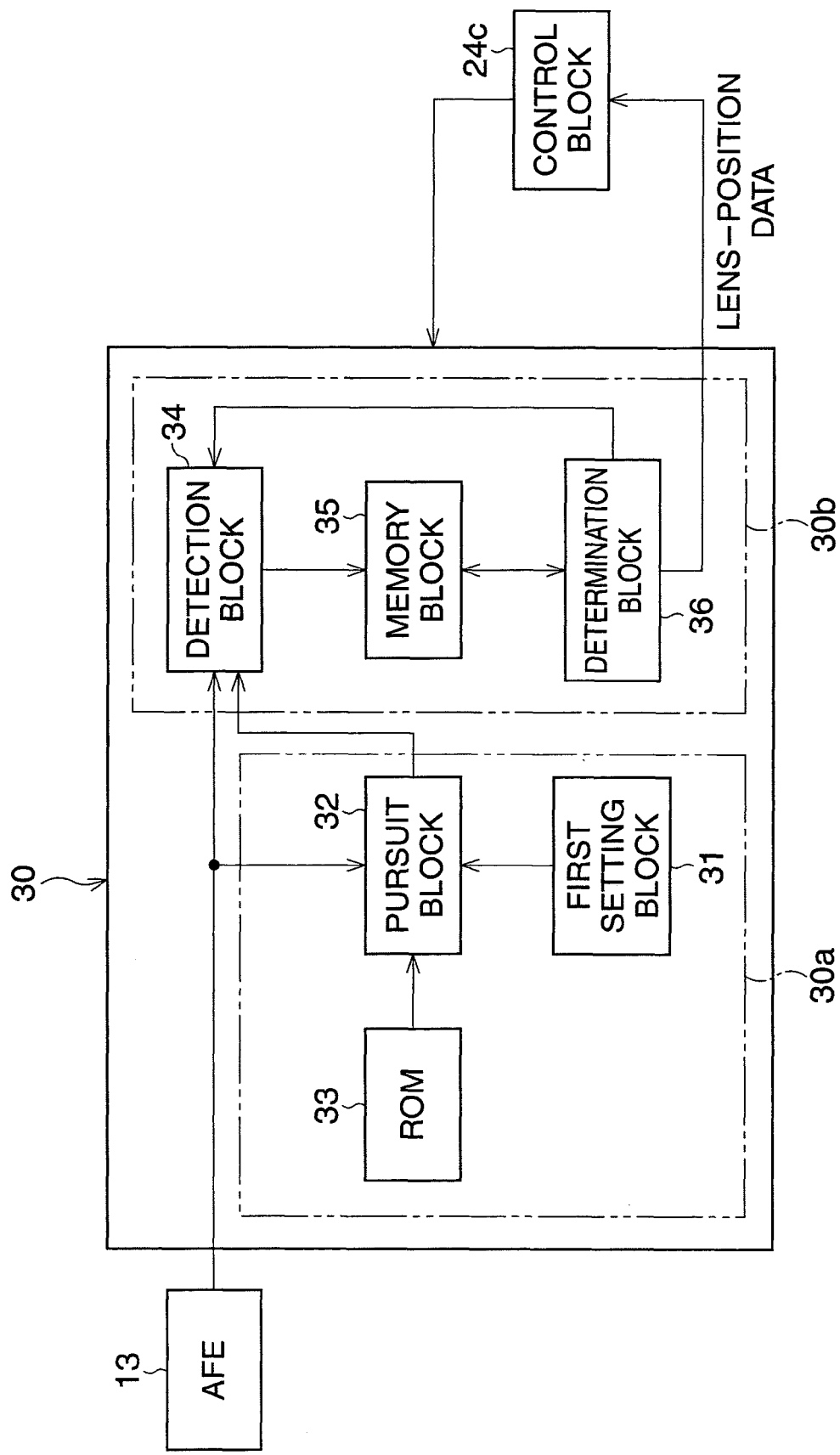
FIG. 3 is a block diagram showing the internal structure of the AF-adjustment block.

Next, the structure and operation of the AF-adjustment block 30 are explained in detail below using FIG. 3. The AF-adjustment block 30 comprises a scanning-area setting part 30a and a position-determination part 30b.

Figure 4:
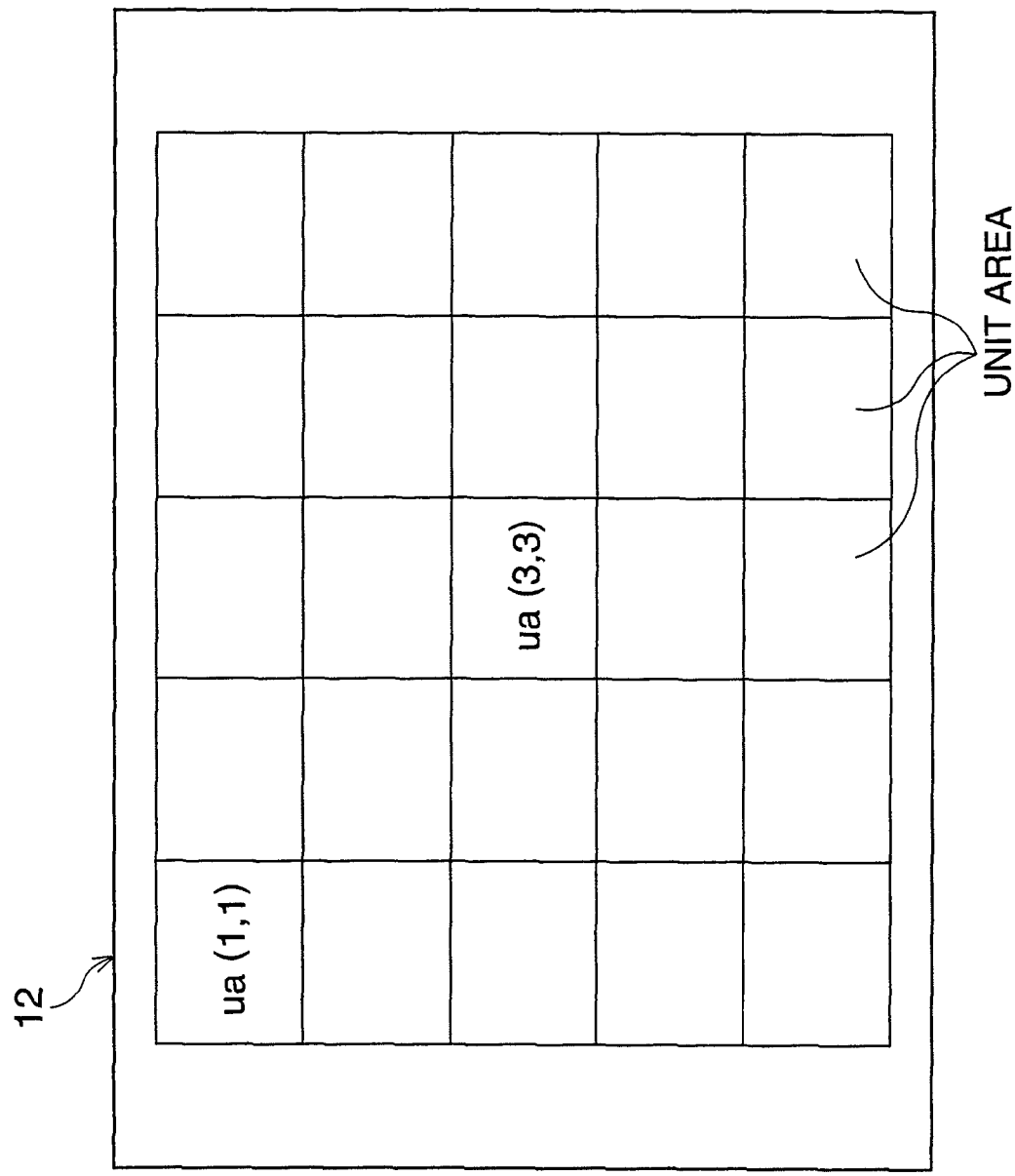
FIG. 4 illustrates an external structure of the light-receiving surface of the imaging device.

The scanning-area setting part 30a selects one unit-area from a plurality of unit-areas on the light-receiving surface and designates the selected unit-area as a scanning-area. Incidentally, the unit-area is one of twenty five areas into which an effective imaging area of the light-receiving surface is divided, and which are arranged in five rows and five columns, as shown in FIG. 4. Hereinafter, the unit-area arranged in the mth row from the top and the nth column from left side, is referred to as ua(m,n). Incidentally, the scanning-area is used for capturing a partial image where a contrast value is detected in order to adjust a position of the focus lens.

The position-determination part 30b determines the position of the focus lens 11b so that the object captured by the scanning-area is in focus.

The scanning-area setting part 30a comprises a first setting block 31, a pursuit block 32, and a ROM 33. The position-determination part 30b comprises a detection block 34, a memory block 35, and a determination block 36. All components are controlled by the control block 24c.

The scanning-area setting block 30a fixes one unit-area as the scanning-area by operating the first setting block 31 when the normal auto focus function is carried out. On the other hand, the scanning-area setting block 30a pursues a target-object moving within the frame of the entire image to be captured, and selects the appropriate unit-area for capturing the pursued optical image at that instant by operating the first setting block 31, the pursuit block 32, and the ROM 33 when the pursuit auto focus function is carried out. Regardless of whether the normal or pursuit auto focus function is carried out, the position-determination block 30b determines the position of the focus lens 11b so that the optical image of the object captured by the scanning-area is brought into focus, as described above.

When the normal auto focus function is carried out, the first setting block 31, the detection block 34, the memory block 35, and the determination block 36 operate as follows.

The first setting block 31 selects one unit-area among the twenty five unit-areas as an initial area, which is used for determination of the scanning-area. The initial area is selected from all twenty five unit-areas based on a command input to the input block 14. For example, the ua(3,3), which is arranged in the center of the effective imaging area of the imaging device 12, is selected as the initial area when on input signal designating this initial area is sent to the first setting block 31 via the control block 24c from the input block 14.

Data corresponding to the selected initial area is sent to the detection block 34 via the pursuit block 32, and the detection block 34 identifies the initial area as the scanning-area in the normal auto focus function. In addition, the detection block 34 receives the image data from the AFE 13, and detects a contrast value of the optical image captured by the scanning-area of the imaging device 12 based on the received image data. Incidentally, the detection block 34 starts to detect a contrast value when the detection block 34 receives the first image data soon after the first switch is switched on.

The detected contrast value and the corresponding position of the focus lens 11b are recorded in the memory block 35. Incidentally, the position of the focus lens 11b is detected by the focusing driver 16 and data corresponding to the detected position of the focus lens 11b is sent to the memory block 35 via the control block 24c.

The focus lens 11b is adjusted twice during successive captures of an optical image. After re-positioning the focus lens 11b, another contrast value of the scanning-area is detected by the detection block 34 and is recorded in the memory block 35. Afterwards in a similar manner, the adjustment of the focus lens 11b, the detection of the contrast value, and the record of the detected contrast value in the memory block 35 are carried out again.

A plurality of the recorded contrast values are read by the determination block 36 before the determination block 36 determines the maximum value among the read contrast values. The determination block 36 also designates the position of the focus lens 11b corresponding to the determined maximum contrast value as in-focus position of the focus lens 11b. The lens-position signal corresponding to the determined in-focus position of the focus lens 11b is then sent to the control block 24c.

Incidentally, the determination block 36 orders the detection block 34 to continue detecting a contrast value until the maximum contrast value is detected. The detection of a contrast value and the adjustment of the focus lens are described in detail below.

The contrast value is detected and recorded in the memory block 35 when the first frame of the optical image is captured. Next, the focus lens 11b is re-positioned through the minimum shift quantity per which the focus lens 11b can be adjusted along the optical axis in the direction toward the near end. After the adjustment, the contrast value of the new position is detected. Following two separate iterations of re-positioning the focus lens, detecting the contrast value, and recording to memory, the two contrast values are compared to one another.

When the contrast value detected after re-positioning is greater than the contrast value recorded in the memory block 35, the re-positioning of the focus lens 11b in the direction towards the near end through the minimum shift quantity, the detection of the contrast value, and the recording of the newly detected contrast value are repeated. When the contrast value decreases during the repetition of the re-positioning, detection, and recording, the determination block 35 then determines that the previous position back towards the far end through the minimum shift quantity is the position of the focus lens 11b that maximizes the contrast value. Data corresponding to this position is sent to the control block 24c as data of the in-focus position of the focus lens 11b.

On the other hand, when the contrast value detected after re-positioning is less than the contrast value recorded in the memory block 35, the focus lens 11b is re-positioned in the direction towards the far end through the minimum shift quantity and the contrast value is detected. Since then, similarly, the movement of the focus lens 11b in the direction towards the far end, the detection of the contrast value, and the recording of the newly detected contrast value are repeated. When the contrast value decreases during the repetition of the re-positioning, detection, and recording, the determination block 35 then determines that the previous position back towards the near end through the minimum shift quantity is the position of the focus lens 11b that maximizes the contrast value. Data corresponding to this position is sent to the control block 24c as data of the in-focus position of the focus lens 11b.

When the pursuit auto focus function is carried out, the first setting block 31, the pursuit block 32, and the ROM 33 operate as follows, and the detection block 34, the memory block 35, and the determination block 36 operate in the same manner as in the normal auto focus function.

The first setting block 31 defines one unit-area among the twenty five unit-areas as an initial area, similarly with the normal auto focus function and data corresponding to the initial area is sent to the pursuit block 32.

The pursuit block 32 processes the data from the initial area and re-defines it as the scanning area. After establishing the scanning area, the pursuit block 32 detects the exposure value of the scanning area, compares the detected exposure value to a threshold value, and carries out a pursuit operation. By carrying out the pursuit operation, a target-object that moves about within a frame of an entire image to be captured is pursued; the pursuit operation is described later.

Almost immediately after the first switch is switched on, the pursuit block 32 receives the first frame of image data from the AFE 13. The exposure value of the scanning area is obtained from the received image data and compared to the threshold value read from the ROM 33. When the detected exposure value is greater than the threshold value, the pursuit operation is carried out.

The first~sixth threshold values are retained in the ROM 33. One of the first~sixth threshold values are selected and used for comparison purposes in conjunction with to the detected exposure value. The first~sixth threshold values are decided so that the first threshold value is lowest, the second threshold value is the second lowest, the third threshold value is the third lowest, the fourth threshold value is the fourth lowest, the fifth threshold value is the fifth lowest, and the sixth threshold value is the highest. The control block 24*c* selects which threshold value the pursuit block 32 reads from among the first~sixth threshold values.

The positions of the zoom lens 11*a* and the focus lens 11*b* are detected by the zooming driver 15. The lens position data is then sent to the control block 24*c*, which determines the focal length of the photographic optical system 11 based on the positions of the zoom lens 11*a* and the focus lens 11*b*. The control block 24*c* then selects one threshold value based on the determined focal length. When the focal length is between n1 (mm) and n2 (mm) (n1<n2), the first threshold value is selected. When the focal length is between n2 (mm) and n3 (mm) (n2<n3), the second threshold value is selected. When the focal length is between n3 (mm) and n4 (mm) (n3<n4) the third threshold value is selected. When the focal length is between n4 (mm) and n5 (mm) (n4<n5), the fourth threshold value is selected. When the focal length is between n5 (mm) and n6 (mm) (n5<n6), the fifth threshold value is selected.

The digital camera 10 has a digital zoom-up feature by which it can magnify a captured image in excess of the maximum magnification achievable with the optical zoom-up feature. The digital zoom-up feature magnifies a partial image captured in a partial area of the light-receiving surface, based on the data processed for image magnification. The partial area is located at the center of the effective imaging area and has the same geometrical shape and aspect ratio as the effective imaging area. Incidentally, the process clock 24*p* processes data for image magnification, and the sixth threshold value is selected when digital zoom-up is carried out.

When the pursuit operation commences, the pursuit block 32 extracts partial data components corresponding to the scanning-area for capturing an optical image of the target-object, based on the image data generated at the first timing. Next, the pursuit block 32 receives the second frame of the image data, generated at the second timing subsequent to the first timing. The pursuit block 32 then extracts partial data components corresponding to the unit areas surrounding the scanning-area set at the previous timing. At this point, the pursuit block 32 carries out pattern matching to specify one unit-area in which to capture the target-object that ahs moved within the entire image to be captured. This specified unit-area then becomes the new scanning-area and the process repeats itself, similarly to the above, where one unit-area capturing the moved target-object is specified, the scanning-area is updated with the specified unit-area and data corresponding to the set scanning-area is sent to the detection block 34.

Incidentally, when the exposure value detected by the pursuit block 32 is below the selected threshold value, the pursuit operation is suspended, and the latest set scanning-area data is continuously sent to the detection block 34. Incidentally, when the exposure value of the scanning-area of the image data generated after suspension of the pursuit operation is greater than the selected threshold value, the pursuit operation is started again.

As described above, the detection block 34, memory block 35, and the determination block 36 operate in the same manner as in the normal auto focus function.

Figure 5:
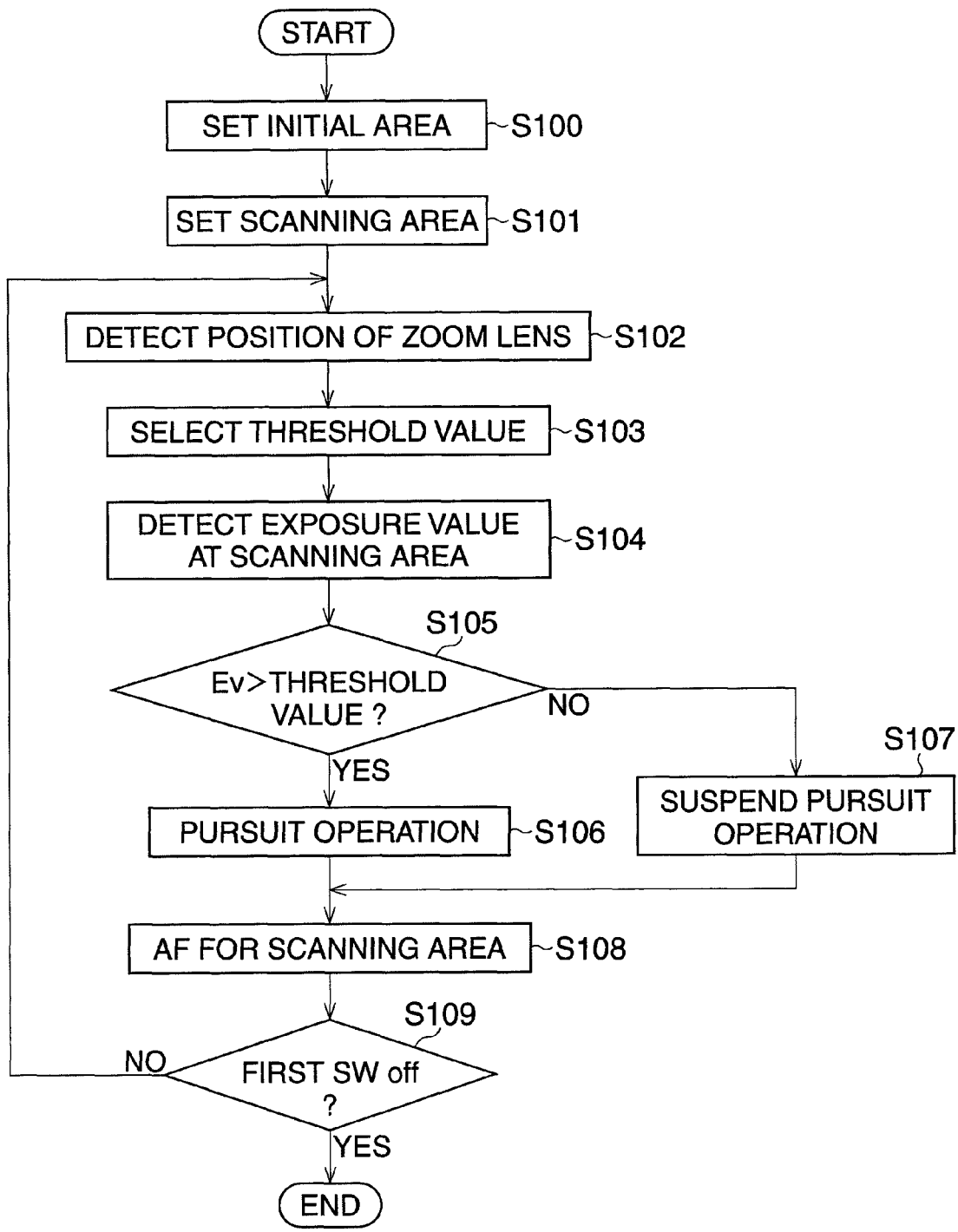
FIG. 5 is a flowchart explaining the process for pursuit auto focus carried out by the DSP.

Next, the process carried out by the DSP 24 in the pursuit auto focus function is explained using the flowchart of FIG. 5. The process for the pursuit auto focus starts when the first switch is switched on by depressing the release button halfway.

At step S100, the initial area is set, based on the first frame of the image data, soon after the first switch is switched on. At step S101 subsequent to step S100, the set initial area becomes the scanning area.

At step S102 subsequent to step S101, the positions of the zoom lens 11*a* and the focus lens 11*b* are detected. Incidentally, when the zoom lens 11*b* is positioned at the telephoto end, it is determined whether or not the digital zoom up is to be carried out. After detection of the lenses' position, the process proceeds to step S103. At step S103, one threshold value is selected from the first~sixth threshold values based on the detected positions of the zoom lens 11*a* and the focus lens 11*b*. The selected threshold value is then compared to the exposure value to determine whether or not to carry out image magnification using digital zoom-up.

When one threshold value is selected, the process proceeds to step S104. At step S104, an exposure value of the scanning-area is detected. At step S105 subsequent to step S104, the detected exposure value and the selected threshold value are compared.

When the detected exposure value is greater than the threshold value, the process proceeds to step S106. At step S106, the pursuit operation of an optical image captured at the scanning-area commences. Accordingly, an optical image captured at the initially set scanning-area is pursued, and the latest unit-area to capture the pursued optical image becomes the latest scanning-area.

On the other hand, when the detected exposure value is equal or less than the threshold value at step S105, the process proceeds to step S107, where the pursuit operation is suspended and the scanning-area is not updated.

After steps S106 or S107, the process proceeds to step S108, where the position of the focus lens 11*b* is adjusted so that the optical image captured in the currently set scanning-area is focused on the light-receiving surface. Accordingly, the pursuit auto focus function is carried out in successive processes at steps S106 and S108, otherwise the normal auto focus function is carried out in successive processes at steps S107 and S108.

After adjustment of the lens position, the process proceeds to step S109, where it is determined whether or not the first switch is switched off. When the first switch remains on by maintaining the release button depressed halfway, the process returns to step S101, and the focus adjustment is repeated. However, if the first switch is switched off at step S109, the focus adjustment is released and the process for the pursuit auto focus completes.

In the above embodiment, it is possible to improve the accuracy of the focus adjustment when the pursuit auto focus function is carried out, as explained below.

When the exposure value of the scanning-area is low, the accuracy of the pursuit of the target-object according to the pattern matching deteriorates. When this occurs, the focus adjustment may be carried out for another object different from the target-object if the prior pursuit auto focus function, where the pursuit operation has not been suspended during the focus adjustment, is carried out. Accordingly, the optical image of the moving target-object cannot be accurately brought into focus.

However, in the above embodiment, when the exposure value of the scanning-area is low or when the magnitude of light incident to at the scanning-area is low, the pursuit operation is suspended and the normal auto focus function is carried out. Accordingly, it is possible to improve the accuracy of the focus adjustment compared to the prior pursuit auto focus function.

In general, a shift quantity of the focus lens 11b for the focus adjustment increases, as the position of the zoom lens 11a approaches the telephoto end. Accordingly, it takes more time to adjust the position of the focus lens 11b when the zoom lens 11a is closer to the telephoto end. If it takes longer to adjust the position, the accuracy of the focus adjustment deteriorates due to a hand shake. As a result, the optical image of the moving target-object cannot be accurately brought into focus.

However, in the above embodiment, the greater the focal length of the photographic optical system 11, the higher the standard for a selected threshold value to suspend the pursuit operation. Accordingly, it is possible to further improve the accuracy of the focus adjustment.

By the way, there is a lower number of pixels included in the scanning-area when the digital zoom up is carried out, compared to when the digital zoom up is not carried out, and the number of pixels used for the pursuit operation arithmetic decreases. Accordingly, the accuracy of the focus adjustment while carrying out the digital zoom up is lower than when carrying out the optical zoom up.

However, in the above embodiment, the threshold value when carrying out the digital zoom up is higher than that when carrying out the optical zoom up. Accordingly, it is possible to improve the accuracy of the focus adjustment when the digital zoom up is carried out.

The twenty five unit-areas on the light-receiving surface are predetermined to be arranged in five rows and five columns. However, any two dimensional arrangement may be adaptable. In addition, the number of unit-areas is not restricted.

The entire optical image, captured by the entire scanning-area from the user-selected initial area soon after the first switch is switched on, is set as the optical image of the target-object in the above embodiment. However, the target-object itself may be recognized according to the contour extraction method, and an optical image of only the target-object itself may be set as the optical image. In this transformation, the unit-area capturing a partial optical image of the target-object may be set as the scanning-are.

The ua(3,3) is initially set as the initial area in the above embodiment. However, another unit-area can be set as the initial area according to the command input to the input block 14.

The first~fifth threshold values are decided according to specific ranges of the focal length of the photographic optical system 11 in the above embodiment. However, the threshold value may be varied so that the threshold value increases in proportion as the focal length of the photographic optical system 11.

Only the sixth threshold value is used for the determination of whether or not to suspend the pursuit operation when the digital zoom up is carried out in the above embodiment. However, the threshold level may change according to an enlargement rate of the digital zoom up. When the digital zoom up is carried out, the image of a partial area with the same geometrical shape and aspect ratio as the effective imaging area, but with a similarity ratio that is less than one, is captured and magnified by the reciprocal of the similarity ratio. Accordingly, it is possible to further improve the focus adjustment as long as the threshold value is determined to be lower in proportion to the higher similarity ratio.

The focus lens 11b is re-positioned towards the near end when the normal or pursuit auto focus functions are carried out in the above embodiment. However, the focus lens 11b may be re-positioned towards the far end.

The auto focus is carried out according to the contrast detecting method in the above embodiment. However, other auto focus methods are adaptable. For example, the phase difference detecting method can be adapted to the above embodiment.

When the magnitude of light incident on the scanning-area is low, the pursuit operation is suspended and the normal auto focus function is carried out in the above embodiment. However, the normal auto focus function may also be suspended, and it may be alerted that the focusing operation is suspended. If the magnitude of light incident on the scanning-area is low, the accuracy of the focusing operation in the normal auto focus function also deteriorates. Accordingly, if the position of the focus lens 11b cannot be automatically adjusted in such a case, the suspension of the focus operation and the alert thereto is the preferred indication method for notifying the user to adjust the position of the focus lens 11b manually.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-045762 (filed on Feb. 22, 2006), which is expressly incorporated herein, by reference, in its entirety.

The invention claimed is:

1. An auto focus unit that brings an optical image of a target-object into focus on a light-receiving surface of an imaging device, the optical image of the target-object being included in an entire optical image, the entire optical image being incident onto the light receiving surface through a photographic optical system, the auto focus unit comprising:
   a pursuit block that pursues movement of an optical image of said target-object within an effective imaging area of the imaging device;
   a lens driver that causes a focus lens of the photographic optical system to move so that an optical image of a constant size scanning-area is focused on the light-receiving surface, a part of said optical image of said target-object being captured in said scanning-area;
   a detection block that detects a light intensity of an area including at least said scanning area; and
   a controller that causes said pursuit block to suspend pursuit of said target-object when said light intensity detected by said detection block is lower than a predetermined threshold value, and said predetermined threshold value is changed in accordance with a change in focal length of the photographic optical system;
   wherein a plurality of predetermined threshold values are stored and one of the stored threshold values is selected based on a focal length of the photographic optical system, and
   wherein pursuit is sustained or suspended in response to a result of a comparison between the predetermined threshold value and the detected brightness value.

2. An auto focus unit according to claim 1, wherein said predetermined threshold value is variable so that said predetermined threshold value increases as a magnification of said target-object increases.

3. An auto focus unit according to claim 1, wherein a first threshold value is used as said predetermined threshold value when said focal length is within a first range, and a second threshold value that is greater than said first threshold value is used as said predetermined threshold value when said focal length is within a second range greater than a maximum value of said first range.

4. An auto focus unit according to claim 1, wherein said imaging device is connected to an image signal processing system that carries out signal processing for image magnification to magnify an optical image captured in a partial area, said partial area being similar to said effective imaging area, a similarity ratio is less than one, and the value set as said predetermined threshold value when said signal processing for image magnification is carried out is higher than the value set as said predetermined threshold value when said focal length is adjusted to a maximum value.

5. An auto focus unit according to claim 1, wherein said imaging device is connected to an image signal processing system that carries out signal processing for image magnification to magnify an optical image captured in a partial area, said partial area is similar to said effective imaging area, a similarity ratio is less than one, and said predetermined threshold value is set so that said predetermined threshold value decreases in accordance with said similarity ratio.

6. An auto focus unit according to claim 1, wherein said lens driver causes said focus lens to move so that said optical image of said scanning-area is focused on said light-receiving surface while said controller causes said pursuit block to suspend pursuit of said target-object, and said scanning-area is designated immediately prior to the suspension of pursuit.

7. The auto focus unit according to claim 1, further including an optical zoom function performed by a zoom optical system and a digital zoom function, said predetermined threshold value comprising a plurality of predetermined threshold values, at least one of said plurality of predetermined threshold values being utilized for each of said optical zoom function and said digital zoom function.

8. The auto focus unit according to claim 7, wherein in the digital zoom mode, the predetermined threshold value is changed according to an enlargement rate of the digital zoom.

9. The auto focus unit according to claim 1, said pursuit block setting the scanning area, and when said controller causes said pursuit block to suspend pursuit of said target object, said controller transmits data of a latest set scanning area to said detection block.

10. The auto focus unit according to claim 1, wherein, after said controller causes said pursuit block to suspend pursuit, and the light intensity detected by said detection block is higher than the predetermined threshold value, said controller causes said pursuit block to pursue the movement of the optical image of said target object.

11. A digital camera including a photographing optical system, the digital camera comprising:
an imaging device that captures an optical image of a target object on an effective imaging area;
a focus lens that brings said optical image of the target object into focus on a light-receiving surface of said imaging device;
a pursuit block that pursues movement of the optical image of the target-object within said effective imaging area;
a lens driver that causes said focus lens to move so that an optical image of a constant size scanning-area is focused on said light-receiving surface, a part of said optical image of said target-object being captured in said scanning-area;
a detection block that detects the light intensity of an area including at least said scanning area; and
a controller that orders said pursuit block to suspend pursuit of said target-object when said light intensity detected by said detection block is lower than a predetermined threshold value, said predetermined threshold value changing in accordance with a change in focal length of the photographing optical system;
wherein a plurality of predetermined threshold values are stored and one of the stored threshold values is selected based on a focal length of the photographic optical system, and
wherein pursuit is sustained or suspended in response to a result of a comparison between the predetermined threshold value and the detected brightness value.

12. The auto focus unit according to claim 11, wherein said predetermined threshold value is variable so that said predetermined threshold value increases as a magnification of said target-object increases.

13. The auto focus unit according to claim 11, wherein a first threshold value is used as said predetermined threshold value when said focal length is within a first range, and a second threshold value that is greater than said first threshold value is used as said predetermined threshold value when said focal length is within a second range greater than a maximum value of said first range.

14. The auto focus unit according to claim 11, wherein said imaging device is connected to an image signal processing system that carries out signal processing for image magnification to magnify an optical image captured in a partial area, said partial area being similar to said effective imaging area, a similarity ratio is less than one, and the value set as said predetermined threshold value when said signal processing for image magnification is carried out is higher than the value set as said predetermined threshold value when said focal length is adjusted to a maximum value.

15. The auto focus unit according to claim 11, wherein said imaging device is connected to an image signal processing system that carries out signal processing for image magnification to magnify an optical image captured in a partial area, said partial area is similar to said effective imaging area, a similarity ratio is less than one, and said predetermined threshold value is set so that said predetermined threshold value decreases in accordance with said similarity ratio.

16. The auto focus unit according to claim 11, wherein said lens driver causes said focus lens to move so that said optical image of said scanning-area is focused on said light-receiving surface while said controller causes said pursuit block to suspend pursuit of said target-object, and said scanning-area is designated immediately prior to the suspension of pursuit.

17. The auto focus unit according to claim 11, further including an optical zoom function performed by a zoom optical system and a digital zoom function, said predetermined threshold value comprising a plurality of predetermined threshold values, at least one of said plurality of predetermined threshold values being utilized for each of said optical zoom function and said digital zoom function.

18. The auto focus unit according to claim 17, wherein in the digital zoom mode, the predetermined threshold value is changed according to an enlargement rate of the digital zoom.

19. The auto focus unit according to claim 11, said pursuit block setting the scanning area, and when said controller causes said pursuit block to suspend pursuit of said target object, said controller transmits data of a latest set scanning area to said detection block.

20. The auto focus unit according to claim 11, wherein, after said controller causes said pursuit block to suspend pursuit, and the light intensity detected by said detection block is higher than the predetermined threshold value, said controller causes said pursuit block to pursue the movement of the optical image of said target object.

* * * * *